United States Patent
Moritz et al.

(10) Patent No.: US 8,843,463 B2
(45) Date of Patent: Sep. 23, 2014

(54) PROVIDING CONTENT BY USING A SOCIAL NETWORK

(75) Inventors: Simon Moritz, Solna (SE); Jonas Bjork, Stockholm (SE); Mattias Lidstrom, Stockholm (SE); Joakim Soderberg, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/254,675

(22) PCT Filed: Jul. 16, 2009

(86) PCT No.: PCT/SE2009/050904
§ 371 (c)(1),
(2), (4) Date: Sep. 2, 2011

(87) PCT Pub. No.: WO2011/008145
PCT Pub. Date: Jan. 20, 2011

(65) Prior Publication Data
US 2012/0005216 A1     Jan. 5, 2012

(51) Int. Cl.
*G06F 17/30* (2006.01)
*G06Q 30/02* (2012.01)
*H04L 29/08* (2006.01)

(52) U.S. Cl.
CPC .............. *G06Q 30/02* (2013.01); *H04L 67/104* (2013.01); *H04L 67/02* (2013.01)
USPC .......................................... 707/705; 707/748

(58) Field of Classification Search
USPC ....................................................... 707/705
See application file for complete search history.

(56) References Cited

U.S. PATENT DOCUMENTS 7,246,131 B2 *   7/2007   Lehmann et al. ............. 707/748
8,583,480 B2 *   11/2013   Byrne ......................... 705/14.4

(Continued)

FOREIGN PATENT DOCUMENTS

| JP | 2002312559 | 10/2002 |
|---|---|---|
| WO | 03102776 A1 | 12/2003 |
| WO | 2008008563 A2 | 1/2008 |
| WO | WO 2008/013240 A1 | 11/2008 |

OTHER PUBLICATIONS

Chakoo, N., et al., "Content Visibility Personalization in Video Recommender Systems", Frontier Computer Science and Technology, 2008 FCST '08, Japan-China Joint Workshop on Frontier of Computer Science and Technology, IEEE, Piscataway, NJ, USA, Dec. 27, 2008, pp. 181-185.

(Continued)

*Primary Examiner* — Kim Nguyen
(74) *Attorney, Agent, or Firm* — Rothwell, Figg, Ernst & Manbeck PC

(57) ABSTRACT

A method of providing content (130) associated with a weight-value, the content (130) previously provided to a current computer associated with a current user (116) that is represented by a first node (106) in a social network (101). The method comprises the steps of: i) enabling the current computer (216) to display the content (130), in dependence of the weight-value, ii) obtaining an input of the current user (116), iii) updating the weight-value of the content (130), in dependence of the input of the current user (116), iv) determining a receiving computer associated with a second node (107) in the social network (101), and v) providing the content (130) to the receiving computer. Corresponding computers, computer program and computer readable medium are also described.

25 Claims, 4 Drawing Sheets

(56) References Cited

U.S. PATENT DOCUMENTS

| | | |
|---|---|---|
| 8,612,869 B2 * | 12/2013 | Tonse et al. .................. 715/762 |
| 8,635,087 B1 * | 1/2014 | Igoe et al. ........................ 705/2 |
| 8,775,287 B1 * | 7/2014 | Igoe et al. ...................... 705/35 |
| 2005/0256756 A1 | 11/2005 | Lam et al. |
| 2008/0097867 A1 | 4/2008 | Engle |
| 2008/0134053 A1 | 6/2008 | Fischer |
| 2008/0301186 A1 | 12/2008 | Svendsen |
| 2009/0069911 A1 | 3/2009 | Stefik |
| 2009/0138505 A1 | 5/2009 | Purdy |
| 2009/0254988 A1 | 10/2009 | Nonaka et al. |
| 2010/0287033 A1 * | 11/2010 | Mathur .......................... 705/10 |
| 2011/0270703 A1 * | 11/2011 | Engle ......................... 705/26.7 |

OTHER PUBLICATIONS

Vallet, D., et al., "Personalized Content Retrieval in Context Using Ontological Knowledge", IEEE Transactions on Circuits and Systems for Video Technology, Piscataway, NJ, USA, vol. 17, No. 3, Mar. 2007, pp. 336-346.

Office Action issued on Jun. 18, 2013, in corresponding JP application No. 2012-520567, 2 pages (English translation only).

Extended European Search Report issued in European Patent Application No. 09847413, 8 pages (Jan. 31, 2014).

* cited by examiner

PROVIDING CONTENT BY USING A SOCIAL NETWORK

CROSS-REFERENCE TO RELATED APPLICATION

This application is a 35 U.S.C. §371 National Phase Entry Application from International Application No. PCT/SE2009/050904, filed Jul. 16, 2009, and designating the United States.

TECHNICAL FIELD

The invention relates to a method, computers, a computer program and a computer readable medium for providing content to a receiving computer.

BACKGROUND ART

Network services like so called recommender systems are today relative well known and are used in different services for recommending various products including media such as movies, music, pictures and books, for example via on-line sales companies like Amazon.com or Internet radio and music community websites like Last.fm.

A commonly used recommender method used in such systems is collaborative filtering which can generate recommendations by computing a similarity between users' preferences for a specific product. Another well known recommender method is the content-based recommender method. In brief, the recommendations are often based on the product description or meta data such as title, description, any static data etc. for the product which may be mapped to a profile or preferences of a certain user visiting a service that utilizes a recommender system.

More specific recommender systems focus on collaborative filtering dealing with self-organizing communities, host mobility, wireless access, and ad-hoc communications. In such domains, knowledge representation and user profiling can be hard as remote servers can often be unreachable due to client mobility. Also, feedback ratings collected during random connections to other users' ad-hoc devices can be useless because of natural differences between persons. To handle these problems a network can be used for epidemically spreading recommendations through spontaneous similarities between users of the network.

Another method for automatic generation of content (product) recommendations is described in US 2008/0134053, where the method provides recommendations for content to a user of a social network service. The method includes: collecting recommendations for content; determining preferences of the user and preferences of the user's social networks; selecting recommendations based on the preferences of the user and the user's social networks; and providing the selected recommendations to the user. For example, content recommendations from a family member or known friend of the user may be highly weighted over other recommendations.

Though the technologies described above may assist in providing a user with a relevant recommendation, they are not always accurate and lack the preciseness of e.g. real life word-of-mouth passing of information.

SUMMARY

In view of the foregoing, it is an object of the invention to provide an improvement of the above techniques and prior art. More particularly, it is an object to enable more efficient distribution of information in a digital format to users.

These objects are fulfilled by a method for providing content to a receiving computer. The content is associated with a weight-value and the content is previously provided to a current computer associated with a current user that is represented by a first node in a social network. The method is performed in an executing computer and comprises the steps of: i) enabling the current computer to display the content for the current user, in dependence of the weight-value, ii) obtaining an input of the current user, wherein the input is associated with the content, iii) updating the weight-value of the content, in dependence of the input of the current user, iv) determining a receiving computer associated with a receiving user that is represented by a second node in the social network, based on a connection in the social network between the first node and the second node, and v) providing the content to the receiving computer.

The executing computer may be a computer server in which case the method can be iteratively performed by traversing a number of nodes in the social network, where the nodes via users are associated with a respective receiving computer. In this case the content can be stored on the server and the communication such as the enabling to display and the obtaining of a user input can be performed by using e.g. a web-browser based technique. The content can be provided, or sent, to any user equipment of the user, or can be associated with e.g. a web-service account of the user, with or without actually displaying the content to the user since the enabling to display is dependant on the weight-value. Accordingly, allowing a user to actually view the content can in some cases require a modification of the weight value.

The executing computer can also be a computer in a serverless network, such as a so called peer in a P2P (peer-to-peer) network. In this case the method can be performed on a number of peers (clients) in a distributed manner where the content may reside (be stored) on one or more of the peers, such that the content is passed from peer-to-peer. In this case the peer is a user equipment that is used for the receiving of the input of the user as well as for the updating the weight-value of the content. The peer then sends the content to other peers associated with users that are represented by nodes connected to the node of the user of the content-sending peer. Here, a peer to which the content is provided is considered a receiving computer.

The content can e.g. be a reference to a content or the content per se, and may, for example, allow the user to listen to music, to view a picture of an item and/or some text describing the item, for example via a display of a client or peer that has the form of a mobile user equipment or of a personal computer etc.

The weight-value can be any variable for determining how the content shall be handled at the receiving computer, for example if the content should be presented to the receiving user, if the content should be discarded, if the content should be associated with the user via e.g. a user account or user equipment, if the content should be stored in the background for some time etc. The weight-value can also define which parts of the content should be handled, e.g. if all of the content or if only a subset of the content shall be displayed.

Typically, enabling displaying of the content in dependence of the weight value can include enabling to display when the weight-value is above a certain level. In this case the weight-value usually has a relative high relevance value and the displaying can be performed via a screen of a user equipment, for example by using a web-like interface of a network service. Here, enabling a computer to display content may include enabling e.g. playing the content (without actually displaying it), displaying the content on the computer, updating information on a web-site such that the user can view the content via a web-browser on his computer etc. In general a higher weight-value can mean that more of the content is actually enabled (shown, played) to a user, while a relatively lower weight-value means that less of the content is enabled.

The input from the user can e.g. include viewing the content, information about how long the content is viewed, if the content is deleted or if it is ignored etc. This means that the user input must not necessarily be an active action performed by the user, i.e. absence of a user input is also regarded a user input.

The social network can basically be seen as a social structure made of nodes (which typically represent individuals) that are tied (connected) by one or more specific types of interdependency, such as values, physical proximity to others, financial exchange, friendship, kinship, interests, frequency of social contact, time spent in proximity with one another, connection to the same network (e.g. a local, ad-hoc network) etc. Social networks can represent both a collection of ties (connections) between people and the strength of those ties. Accordingly, in this context the user is associated with a respective node in the social network while his association with other users is implemented as ties between the nodes.

One advantageous effect with the invention lies in an improved relevance of content provided to a user, which effect is achieved by virtue of taking the actions of other users of the same network into account when providing the content to a user. Depending on configuration, another advantage lies in a possibility to spread the content among peers only, i.e. spreading the content without using a central server to which several clients are connected. In this case the content can be stored on the peers only. However, in case the content uses a reference for accessing information or media, the information/media may be stored on a server, but the transferring of content in the form of a reference is still performed on a P2P basis only.

The method may comprise allowing the current user to forward the content to the receiving computer. This typically means that the user can determine the second node, for example by allowing the current user to, from a list of persons, select a person to which the content shall be forwarded to and which is represented by the second node. In this case the weight-value can be updated by giving it a higher value for increasing the likeliness that the content is e.g. displayed at the receiving computer.

The method may comprise combining weight-values associated with similar contents enabled at the current user. This case can be used when e.g. a node has ties with several nodes associated with computers from which the content was provided.

The updating of the weight-value may comprise updating the weight-value in dependence of a connection between the node of the current user and the node of the receiving user. For example, when a connection indicates that a subsequent node represents a family member, the weight-value can be given a higher value, while the weight-value is given a lower value if the connection indicates e.g. "attendance at a common class held 15 years ago".

The updating of the weight-value may comprise updating the weight-value in dependence of the content and/or data of the node currently traversed. For example, if the user data indicates that the user is an expert within the field of the content, the content can be given a higher value.

The updating of the weight-value may comprise updating the weight-value in dependence of a user selected variable.

Examples of such a variable can be "recommend" or "do not recommend", or it can be a relative scale where the user can indicate his experience of or how much he likes the content.

The updating of the weight-value may comprise updating the weight-value in dependence of a time passed from the enabling to display the content and the receiving of the user input. For example, if a user does not view the content until a relative long time has passed, the weight-value can be set relatively lower than if the content was viewed more within a comparably shorter time.

The updating of the weight-value may comprise decreasing the relevance of a previous updating in dependence of an increased distance between the current node and a node that previously received the content. This is advantageous in that weight-values from users closer to the current user (node) can be given a higher relevance than more distant users, which results in a more accurate providing of the content as e.g. close friends often have a relatively similar taste.

A practical example of how relevance for more distant users can be decreased includes applying a weight factor for each previous updating of the weight-value, i.e. a weight factor is applied on the weight-value. In this case information indicating how a number of previous users affected the weight-value can be stored.

The content may comprise a reference to information describing the content. For example, the reference may be an International Standard Book Number (ISBN), primary key to content in a database, a hyperlink on an Internet web-page or in a software application running on a computer etc.

The content may comprise an identifier of the social network node of the user that provided content, and/or an identifier of a source of the content. Here, the source can be the first user that provided the content to another user.

The content may comprise a reference to one or more node(s) associated with computers (via their respective users) that previously received the content, and/or the content may comprise time data set at the providing and/or enabling to display of the content. Also, the content may be defined by a data structure comprising the content and the weight-value.

As indicated, the executing computer can be a computer server while the current computer and the receiving computer are computer clients connected to the computer server. In another version, the executing computer is the current computer while the current computer and the receiving computer are computer nodes in a peer-to-peer network.

According to another aspect of the invention a computer server for providing content is disclosed. The content is associated with a weight-value and is previously provided to a current computer client associated with a current user that is represented by a first node in a social network. The computer server comprises: i) means for enabling the current computer client to display the content for the current user, in dependence of the weight-value, ii) means for obtaining an input of the current user, wherein the input is associated with the content, iii) means for updating the weight-value of the content, in dependence of the input of the current user, iv) means for determining a receiving computer client associated with a receiving user that is represented by a second node in the social network, in dependence of a connection in the social network between the first node and the second node, and v) means for providing the content to the receiving computer.

Typically, the computer client to which the content was previously provided and the receiving computer may each be computer clients connected to the computer server.

A according to still another aspect of the invention a computer for providing content is disclosed. The content is associated with a weight-value and is previously provided to the computer which is associated with a current user that is represented by a first node in a social network. The computer comprises: i) means for enabling the computer to display the content for the current user, in dependence of the weight-value, ii) means for obtaining an input of the current user, wherein the input is associated with the content, iii) means for updating the weight-value of the content, in dependence of the input of the current user, iv) means for determining a receiving computer client associated with a receiving user that is represented by a second node in the social network, in dependence of a connection in the social network between the first node and the second node, and v) means for providing the content to the receiving computer. Here, the computer for providing content and the receiving computer may each be computer nodes in the same peer-to-peer network.

The computer and the computer server for providing content may each comprise a respective: means for allowing the current user to forward the content to the receiving computer; means for combining weight-values associated with similar contents enabled at the current user; and means for updating the weight-value of the content in dependence of a connection between the first node and the second node.

The means for updating the weight-value may be configured to: update the weight-value in dependence of the content; update the weight-value in dependence of a variable selected by the current user; and update the weight-value in dependence of a time passed from the enabling of displaying of the content and the obtaining of the user input.

The means for updating of the weight-value may be configured to decrease the relevance of a previous updating in dependence of an increased distance between the first node and a node representing a user associated with a computer that previously provided the content.

The content handled by the computer and the computer server may comprise: a reference to information describing the content; an identifier of a user associated with a computer that first provided the content to any receiving computer; a reference to a number of users associated with a respective computer that previously provided the content to any receiving computer; and time data set at the time of enabling of displaying of the content. Also, the content may here be defined by a data structure comprising the content and the weight-value.

According to a further aspect of the invention a computer program is provided which comprises processing instructions which when run on a computer system causes the computer system to perform the above described method.

According to another aspect of the invention a computer program product is provided, which comprises computer readable means and the computer program, which is stored on the computer readable means.

The inventive computer server, the computer, the computer program and the computer program product may each be configured/comprise means for implementing any of the features described above in association with the inventive method, and each share the corresponding advantages.

BRIEF DESCRIPTION OF THE DRAWINGS

Embodiments of the invention will now be described, by way of example, with reference to the accompanying schematic drawings, in which.

DETAILED DESCRIPTION

Figure 1:
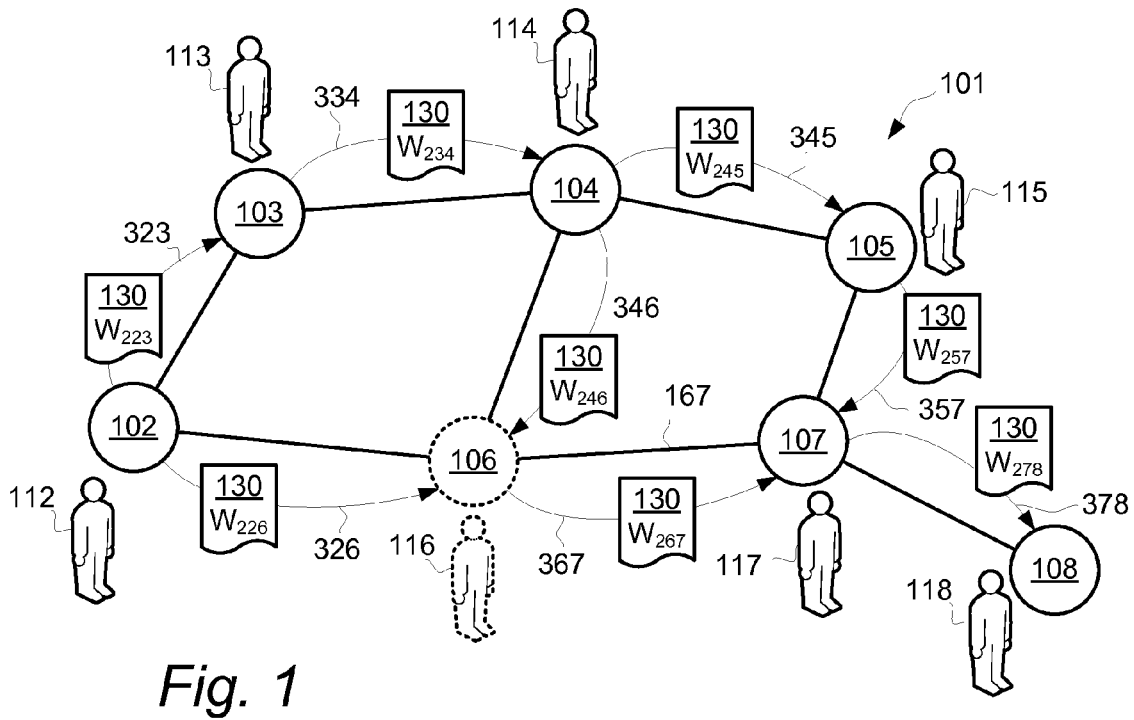
FIG. 1 illustrates a social network, individuals of the social network and content provided by using the social network according to an embodiment of the invention.

With reference to FIG. 1 an exemplifying a computerized social network 101 is illustrated where a number of (social network) nodes 102-108 are mutually connected (tied), as illustrated by the straight lines drawn between the nodes 102-108. Each of the nodes 102-108 is associated with a respective user 112-118 where the associated user is illustrated adjacent the node, such as user 112 adjacent node 102. The association between the nodes 102-108 and the users 112-118 is implemented by including an identifier of the user in data describing the node, as is common within the art.

Accordingly, the social network 101 is a representation of a social structure that is made of the nodes 102-108 (which are generally individuals or organizations) that are tied by one or more specific types of interdependency, such as values; visions; ideas; organizations; participation in a previous, current or future event; financial exchange; friendship; kinship; dislike; conflict; trade; time spent in contact via e.g. a social network service, etc. The social network 101 can be analyzed and traversed by using a social network analysis tool that views and traverses social relationships in form of the nodes 102-108 and ties there between. For this purpose the nodes 102-108 can have a data structure that includes i) a nodeID which can be an integer that forms the identifier of the user associated with the node, and ii) a set of ties where each tie includes a tiedNodeID and a tieStrength. The tiedNodeID can in a manner corresponding to nodeID be an integer that forms an identifier of another user (node) tied to the user associated with the nodeID, while tieStrength indicates the strength between the node identified by nodeID and the other node identified by tiedNodeID.

The strength between the nodes can be indicated by using a relative scale where an increased value on the scale indicates a stronger connection. For example, if a scale from 0 to 1 is used 0.3 can represent an unknown person, 0.6 a known person while 1 represents a well known and/or trusted person.

The social network 101 is managed by a network server that will be further described below and which comprises the data forming the social network 101 as well as the social network analysis tool which is implemented as one or several software modules. The social network analysis tool comprises functionality for traversing the nodes 102-108 of the social network 101 and for analyzing the social network 101 by performing various metric operations and for conveniently defining nodes and ties between the nodes. Examples of suitable operations on networks can be found in available social network analysis software, such as in iPoint, NetMiner, InFlow or in the open source packages Social Networks Visualiser and SocNetV.

More particularly, the social network 101 can be a social network implementation that facilitates communication between persons, such as Facebook, Orkut, LinkedIn, Plaxo, Cyworld, Mixi, QQ and MySpace. In practice, a node in a social network implementation is generally created when a new user creates an account in the social network implementation. Hence, from a technical point of view, it is possible to view each node 102-108 as a user account of a social network service. Of course, it is also possible to use other types of temporary or more permanent local or global networks.

The social network 101 and the social network analysis tool is used for traversing the nodes 102-108 in a manner that allows spreading of content 130 (information) in e.g. a social network implementation or in a recommender system in an effort to automatically mimic a "word of mouth"-behavior of real persons, where spreading of unwanted content 130 can decrease. The "word of mouth" concept can include letting one of the users 112-118 act as a provider of the content 130 to a number of other users, and allows adjustment of the provision of the content 130 depending on e.g. the travelling path of the content 130, content travelling speed, social graph depth etc. without the source necessarily knowing anything about the subsequent processes for the providing of the content 130. Hence, the content 130 must not in a server-like manner exist in computers used by users of nodes previously traversed.

Generally and as exemplified below, a user, a node and a computer such as a user equipment are mutually associated. Hence, the traversing of nodes in the social network can be seen as traversing of users or as traversing of computers.

The content 130 is typically a piece of information such as video, audio, picture or text information, or a reference to information which can be retrieved by the user via the reference. The content 130 is passed from one node to the next node by providing the content to a subsequent node, which in FIG. 1 is illustrated by the arrows pointing from one node to another node. For example, content 130 is passed from node 102 to 103 as indicated by arrow 323, i.e. the content 130 is provided to node 103 from node 102.

In the example embodied in FIG. 1 the content 130 is provided at seven nodes 102-108 in eight instances since the content 130 is provided twice at both node 106 and node 107, as indicated by arrows 323, 334, 345, 357, 378, 326, 346 and 367. From the example it follows that node 102 (user 112) is the source node (source) from which the content 130 originated.

The content 130 is provided as a function of (i.e. in dependence of, based on)) a weight-value associated with the content 130. The weight-value can change when the content 130 is passed from one node to another, resulting in one weight-value $W_{223}$ for the content 130 when passed from node 102 to node 103 and another weight-value $W_{234}$ when the content 130 passed from e.g. node 103 to node 104. As can be seen, each time the content is provided to a next node a respective weigh-value $W_{223}$, $W_{234}$, $W_{245}$, $W_{257}$, $W_{278}$, $W_{226}$, $W_{246}$, $W_{267}$ is applied for the content 130.

Figure 2:
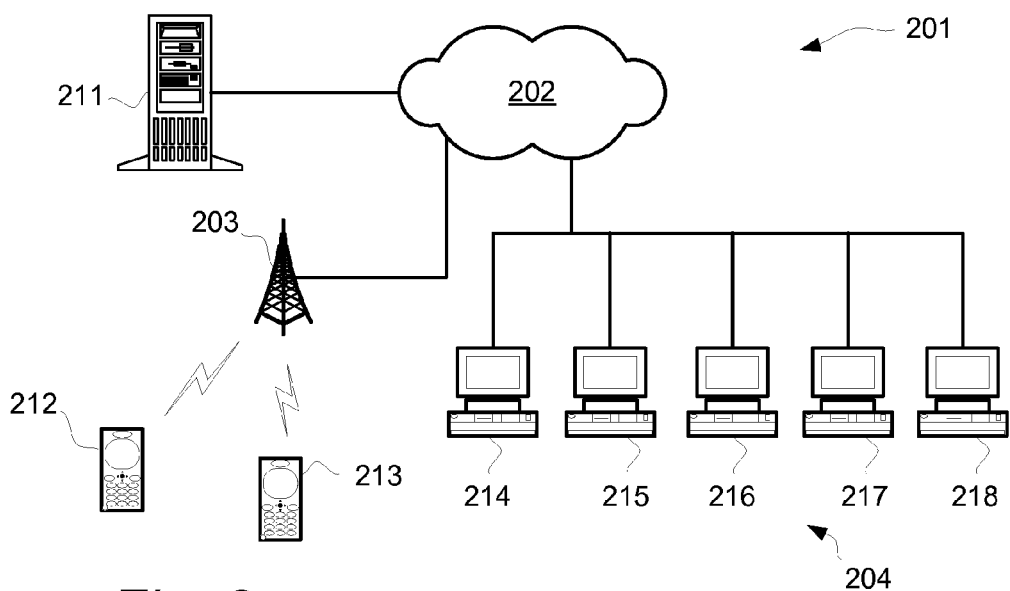
FIG. 2 illustrates a computer system implementing the invention.

Turning to FIG. 2 a computer system 201 implementing the social network 101 and allowing the users 112-118 to interact via the social network 101 is illustrated. In the computer system 201 the network server 211 is connected via a network 202 such as the Internet with a number of user equipments (clients) 212-218. The users equipments 212-218 include, for example, conventional mobile user equipments 212, 213 and personal computers 214-218 configured to communicate with the network server 211 and with each other via the network 202. The mobile user equipments 212, 213 are connected to the network 202 via wireless communications link that is established by using a base station 203. Here, "user equipments" also includes devices like Internet Protocol Television units which accordingly also may communicate with the network server 211 and with each other via the network 202.

The base station 203 is configured to support one or more communication protocols for implementing the wireless communication link, whether short or long range, and the base station 203 is typically a mobile or cellular access point such as a conventional NodeB in UTRAN (Universal Mobile Telecommunications System Terrestrial Radio Access network or eNodeB of an evolved UTRAN/LTE (Long Term Evolution) network, but can also be an 802.xx-type access point.

The user equipments 212-218 are associated with a respective user 112-118 and allows the users 112-118 to mutually communicate and exchange various kinds of information in accordance with functions of the social network 101.

As earlier indicated, the nodes 102-108 can be associated with a user via a user account of a social network service or via a more general identifier. However, it is also possible to associate a node with a user via e.g. an identifier like the International Mobile Subscriber Identity of a SIM-card in a user equipment of the user, via the MSISDN or any coded version of MSISDN. Other possibilities includes associating the nodes 102-108 of the social network 101 with the user equipments 212-218, for example via hardware addresses like the Media Access Control addresses, via a URI (Uniform Resource Identifier) or an IP-address associated with the user equipment or via the International Mobile Equipment Identity in case such an address is available. In case the node is associated with the user equipment, the association between the user and the node can be based on an association between the user equipment and the user.

The social network 101 implemented in the computer system 201 is as indicated traversable and facilitates for providing information to a user when connected to the social network 101 via a user equipment. By traversing the nodes 102-108 in a structured manner it is possible to automatically evaluate and process data and spread content 130 that is likely to be considered more relevant.

The computer server 211 is an example of an executing computer that can provide the content to the clients 212-218 in accordance with the method further described below. However, the content can be provided to clients, or more specifically peers, without using a central server. In this case communication between the clients can be implemented as a peer-to-peer (P2P) solution with a distributed application architecture that partitions the work load of providing the content. The clients 212-218 are then peers that are equally privileged, equipotent participants in the providing of the content. The implementation of a P2P solution can be based on currently available P2P protocols, and, in this case, the clients 212-218 of FIG. 2 form a P2P network 204. In case of the P2P implementation, a peer in the form of any of clients 212-218 is then an example of an executing computer that can provide the content to the one or more other peers in accordance with the ties of the social network 101.

Both in case of a server-client solution and a P2P-solution, the method has an iterative character and typically results in a number of traversed computers.

Since the social network is used for the providing of the content, the content can be seen as provided to computers, nodes and/or users, as mutually relationships are established between these entities. In a similar manner it can be said the method traverses computers, nodes and/or users.

Figure 3:
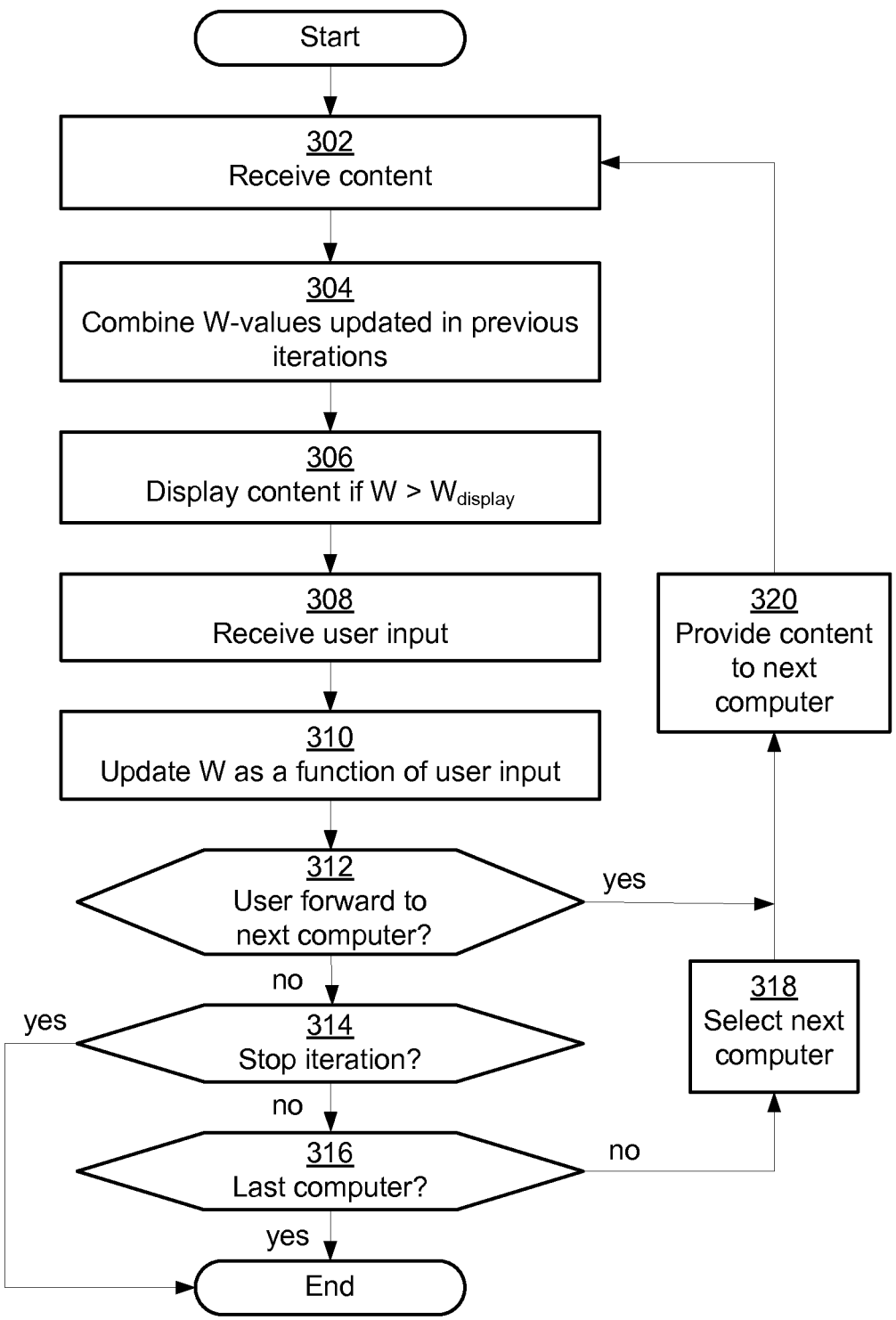
FIG. 3 is a flow diagram of an embodiment of the inventive method performed in the computer system of FIG. 2.

Accordingly and with reference to FIG. 3, a flow diagram for the traversing of the nodes 102-108 in the social network 101 is illustrated. As can bee seen the method is iterative where each iteration, i.e. executing of the method, is performed on a certain peer or on the server for a certain client, and starts with the step of receiving 302 the content, typically from the server or another peer. For purpose of illustration, node 106 of FIG. 1 is considered the node 103 currently traversed by the server alt. considered the executing peer, while the node first traversed is node 102. Hence, in this example the current user is user 116 while the current computer is computer 216.

After the providing 302 of the content 130, weight-values $W_{223}$, $W_{234}$, $W_{246}$, $W_{226}$ updated in previous iterations can be combined 304 as will be described in detail below. This means that if the content 130 arrives from more than one node which is the case for the node 106, the combination of weight-values $W_{226}$ and $W_{246}$ can be determined. Also, a combination of weight-values from previous iterations can be determined, such that e.g. the content 130 is provided at node 106 as a function of $W_{223}$, $W_{234}$, $W_{246}$ and $W_{226}$.

Next, if the weight-value or the combination of weight-values are above a predetermined weight-value $W_{display}$, the computer in the form of a user equipment is enabled (allowed) to display content 130, which accordingly is displayed 306 on the user equipment of the user associated with the current node 106. After the content 130 is displayed 306 a user input is received 308 and the weight-value is updated 310 as a function of the user input, typically by increasing the weight-value when a positive evaluation of the content is given. When forwarded from node 106 to node 107 the updated weight-value is $W_{267}$. Thereafter it is determined 312 if the user forwards the content 130 to the next node 107 in the social network. If the content 130 is forwarded from node 106 then the content 130 is provided 320 to the user 117 associated with the next node 107, i.e. the iterative process continues with the next node 107 receiving the content 130.

Allowing the user to forward the content can be implemented as a conventional software module that presents a list of users connected to the current user via ties of the social network. The current user then selects whom to forward the content to. In a similar manner user input form the current user is received by using conventional software modules for monitoring and registering various user inputs, such as functionality for detecting when a user has logged in to his user account on a social network service, has initiated a software module implementing the method, has used a reference leading to the content etc.

If the user does not forward the content 130 it is determined 314 if the iteration shall be stopped, for example when the content 130 is relevant only during a certain period of time and that time has expired. If the iteration is not stopped it can be determined 316 if the last node has been traversed. In case the last node has not been traversed a next node can automatically be selected 318, for example after a certain time, and the content 130 is then provided via the receiving computer 217 to the receiving user 117 associated with the next node 107, i.e. the method continues at the next node 107. The selection of a "next node" is performed according to known methods in available social networking analysis tools, but basically includes traversing to a node connected to the current node.

The step of determining 316 if the last node has been traversed may be omitted, such that the nodes are traversed by the forwarding 312 operation only. That is, in a more simple version the content 130 is forwarded to a receiving node only if the user associated with the current node explicitly chooses to do so. If the content 130 is not forwarded, the iteration is halted until the content 130 finally is forwarded.

In further detail, the content 130 is a reference to a content or the content per se, and typically the content 130 is a piece of media data, text information or e.g. a reference like a hyperlink to such data or information. The content 130 can be seen as a data wrapper with a structure with a number of properties of a certain value type in accordance with table 1 below, where the properties of the content are also described.

TABLE 1

| Property | Value type | Description |
|---|---|---|
| contentID | Integer | Identifier of the content |
| contentRef | Pointer, integer etc. | Reference to the content, such as ISBN, ID of a YouTube video clip, hyperlink etc |
| contentType | | A classification of the content (e.g. soccer, golf, stock market, travel, book etc.) |
| contentData | | The content per se to be provided to the user |
| sourceNodeID | Integer | Identifier of the node from which the content originated |
| currentNodeID | Integer | Identifier of the node currently traversed |
| receiveTime | Time | Time for when content is received at the node (user) |
| provideTime | Time | Time for when content was forwarded from the previous node |
| inaugurationTime | Time | The time when the content was inaugurated, i.e. first created and provided to a user |
| trailHistory | List of nodes | A list of previously traversed nodes |
| W | Integer | The calculated weight-value of the content (a function of T, R, E, D, contentType, source NodeID and currentNodeID) |
| T = time | Time | A time dependant function return value affecting W (see formula [1] below) |
| R = rating | Integer | A user dependant function return value affecting W (see formula [2] below) |
| E = edge | Integer | A tie (connection between nodes) dependant function affecting W (see formula [3] below) Can be same as tieStrength |
| D = distance | Integer | A function depending on the number of ties the content 130 has passed on its way to the node currently traversed (see formula [4] below) |

The value types of contentType and contentData are typically dependant on the type of content provided, and can include a text type, video type, audio type etc. As the skilled person realizes, the value types above are only exemplifying types, as other types may be used as well.

Often only one of the properties contentRef and contentData is included in the content 130, since including both of these properties is frequently redundant.

In detail, the receiving 302 of the content 130 means that the content is made available at the receiving computer, either directly or as mentioned via a reference displayed when e.g. using a social network service implementing the social network 101. This includes the possibility that the content 130 is not displayed to the user until the weight-value is sufficiently large, for example when the same content after some time arrives from another node and gives a combined weight value sufficiently large for initiating display of content.

Weight-values can hence be combined 304 when the same content arrives from two different nodes, resulting in a higher likelihood that the content 130 shall be displayed. Determining if two contents are same can be done by comparing the contentID or contentRef of the contents. If one of these properties are same the contents are considered same. Also, services like the commercially available TrackID™ can be used for verifying if contents are same. The latter would of course involve establishment of a connection to such a service.

Figure 4:
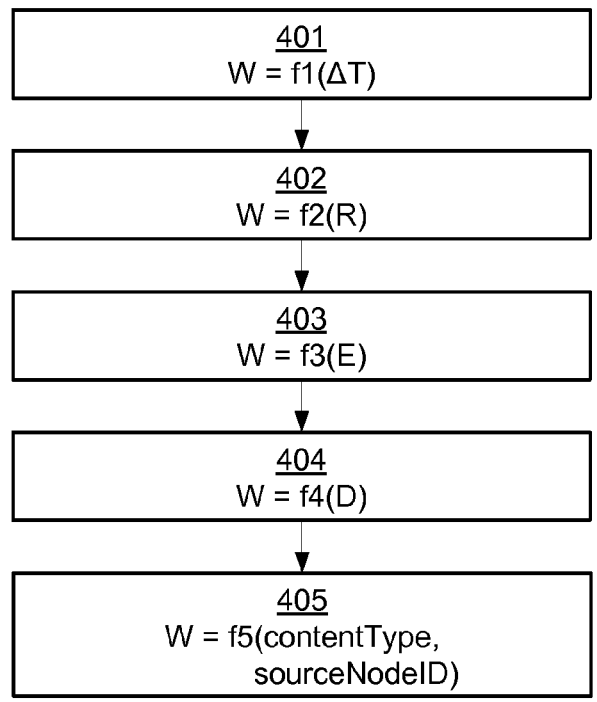
FIG. 4 is a flow diagram of an embodiment for determining a weight-value of the content of FIG. 1.

Also, with reference to steps 401-405 FIG. 4, during each iteration a weight-value is determined as a function of T, R, E, D, contentType, sourceNodeID and currentNodeID listed in table 1, or by a subset thereof. Here, each of T, R, E, D, contentType, sourceNodeID and currentNodeID or any calculated combination thereof can act as the previously discussed weight-value. This means that the updating 310 of the weight-value of the content 130 can include updating any of T, R, E, D, contentType and sourceNodeID.

The first step 401 of FIG. 4 uses a function f1 or f11 that takes the time ΔT spent at the node into account, where ΔT=provideTime−receiveTime. For this a step-function can be used if a discrete decrease of the tipping value is desired, such as:

$$T1 = f1(\Delta T) = \begin{cases} 2 & 0 \leq \Delta T < 2 \\ 1 & 2 \leq \Delta T < 4 \\ 0 & 4 \leq \Delta T \end{cases} \quad [1]$$

If a continuous function is desired, this can be derived from a modified Heavy-Side function like:

$$T11 = f11(\Delta T) = \frac{-b}{1 + e^{-\frac{\Delta T - c}{a}}} + b \quad [2]$$

where a, b, and c are constants chosen based on desired reduction of the weight value, such a a=0.1, b=2, and c=0.5.

The second step 402 of FIG. 4 uses a function f2 where the weight-value is updated as a function of a user selected variable such as a positive or negative evaluation of the content by the user. As an example of f2, the following formula can be used:

$$R = f2(R_{previous}, R_{current}) = c \cdot R_{previous} + d \cdot R_{current} \quad [3]$$

where c+d=1, and d>c. More specifically, the R-value of the content is set to the return value of f2 which will result in that each new rating will be weighted relatively higher than an older (more distant) rating. The calculated R at one node will be $R_{previous}$ at the next node while $R_{current}$ is the rating given by the user associated with the current node.

The third step 403 of FIG. 4 uses a function f3 where the weight-value is updated as a function of the connection between the traversed (current) node and the node to be subsequently traversed (receiving node). This means that the social network analysis tool is used for determining which node is after the current node, before performing the step of updating the weight-value R.

In this example the edge E can e.g. be set to tieStrength as tieStrength has a value from 0 to 1, such that:

$$E = f3(tieStrength): 0 < E < 1 \quad [4]$$

The fourth step 404 of FIG. 4 uses a function f4 taking the distance for how many nodes/users the content has passed into account, such that:

$$D = f4(Distance): D > 0 \quad [5]$$

where D can be increased by, for example, 0.3 for each node traversed.

The fifth step 405 of FIG. 4 uses a function f5 that updates the weight-value as a function of sourceNodeID, currentNodeID and/or contentType. The function f5 can be a combined step function where a weight factor is set to increase the weight-value in case the sourceNodeID is indicative of a user that is known to be an expert related to the content (such as a golf pro in case the content concerns golf). The weight factor can further be increased if currentNodeID is indicative of an expert within the field of the content. Also, if contentType is indicative of a field of interest of the user associated with the current node, the weight-value is further increased. Here, the exact increase of the weight-value as a function sourceNodeID, currentNodeID and contentType can be implemented as suitable for obtaining a proper balance between the different properties.

Also, a combined weight-value W can be determined, for example by using a formula like:

$$W = x1 \cdot T + x2 \cdot R + x3 \cdot E + x4 \cdot D + x5 \cdot f5(contentType, sourceNodeID, currentNodeID) \quad [6]$$

where x1, x2, x3, x4 and x5 are values determining the importance of each factor in accordance with e.g. a preference of an operator using the method described herein.

When content arrives to one node from i number of nodes, each factor T, R, E and D from the arriving content can be weighted together, or the arriving weight-values can be weighted together. This can be done for any or all of the properties of the content in e.g. the following way, where T is used as an example:

$$T = y1 T1 \cdot \ldots \cdot yi Ti \quad [7]$$

where y1+ . . . +yi≥1 and y1 to yi are chosen such that the factor from the source with higher importance will be enhanced.

The formula [7] for merging factors like T, R, E and D can also be used for merging a weight-value W that is based on these factors. Also, the same merging operation can be used when merging weight factors/values of same content originated from different sources, i.e. when the sourceNodeID of two contents are different but when e.g. vales if contentRef are same.

Figure 5:
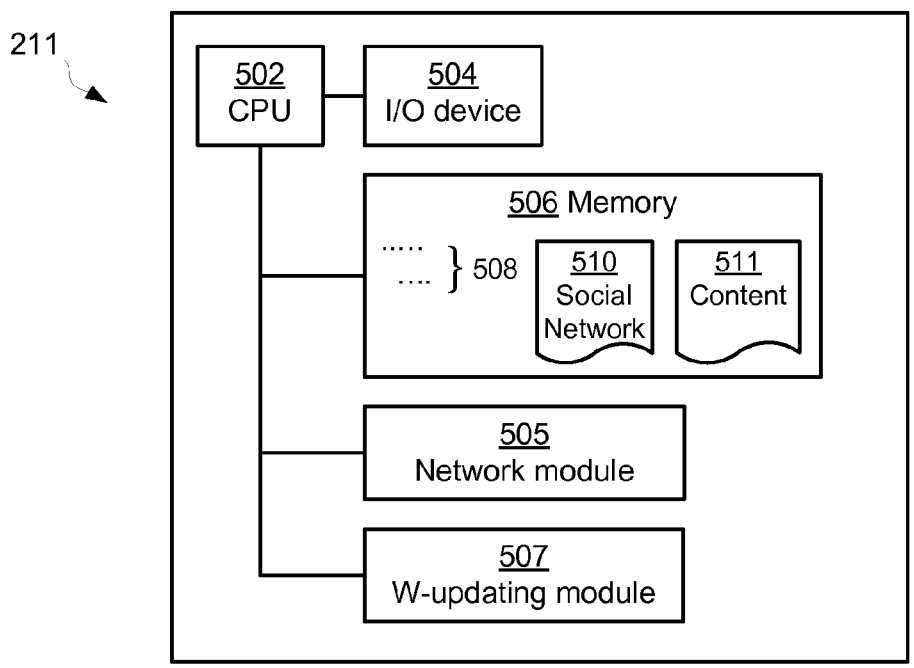
FIG. 5 illustrates a computer server in the computer system of FIG. 2.

With reference to FIG. 5 the computer server 211 is illustrated in further detail and comprises a central processing unit (CPU) 502 operatively connected to an Input/Output (I/O) device 504, a social network module 505 that includes the functionality for traversing and performing operations on the social network 101 and a weight updating module 507 implemented to update the weight-value as described above. In a computer program product 506 in the form of a memory unit comprising computer readable medium a computer program 508 is stored. The computer program 508 causes the computer server 211 to perform the above described method as implemented in a computer server when the computer program 508 is executed by the CPU 502. Data 510 forming the social network 101 and data 511 forming the content 130 is also stored in the memory unit. However, the data representing the social network as well as the content can be stored on one or more other computer servers or in other memory units. Program modules of the computer program 508 corresponding to the different steps of them method may in alternative embodiments be stored on different memory units in the computer server 211.

Figure 6:
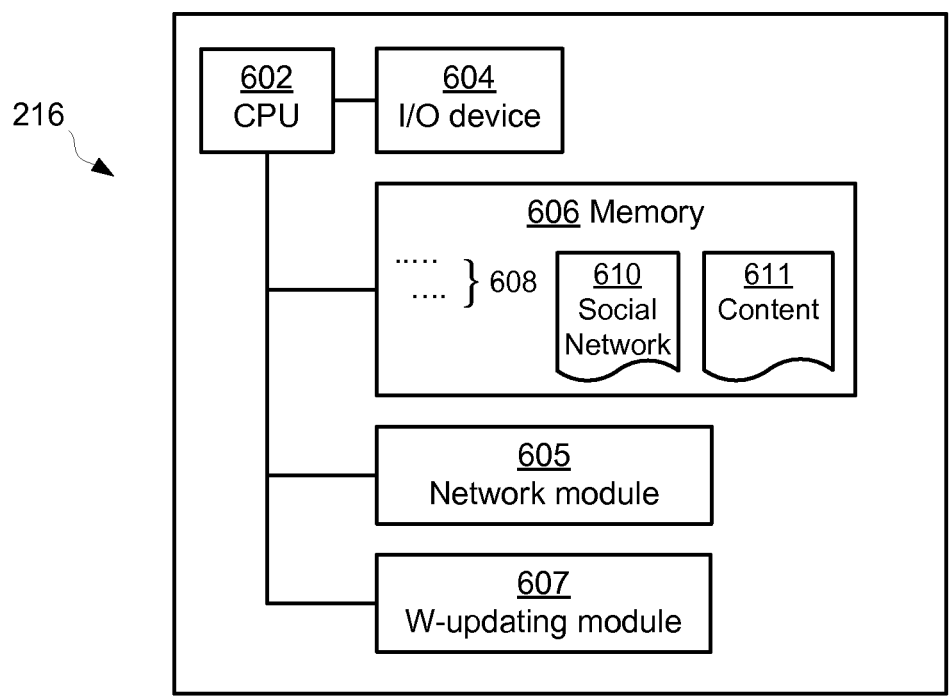
FIG. 6 illustrates a computer client in the computer system of FIG. 2.

With reference to FIG. 6 the computer client 216 is illustrated in further detail and comprises a central processing unit (CPU) 602 operatively connected to an Input/Output (I/O) device 604, a social network module 605 that includes the functionality for traversing and performing operations on the social network 101 and a weight updating module 607 implemented to update the weight-value as described above. In a computer program product 606 in the form of a memory unit comprising computer readable medium a computer program 608 is stored. The computer program 608 causes the client 216 when acting as a peer to perform the above described method when the computer program 608 is executed by the CPU 602. Data 610 forming the social network 101 and data 611 forming the content 130 is also stored in the memory unit. For the client, the data representing the social network as well as the content can be stored on one or more other computers or in other memory units, and program modules of the computer program 608 corresponding to the different steps of the method may in alternative embodiments be stored on different memory units in the client 216.

The method can be implemented in e.g. a social networking service, as a software application installed at each client of the users, as an applet running in a web-browser executed on the clients etc. Moreover, the steps of the method must not necessarily be performed in the order described.

Of course, the social network and social network services described herein are in addition implemented according to known standards and protocols within the field of social networking and communication. In fact, the described method may be implemented on conventional social networking services as well as on recommender systems like pricerunner.com or kelkoo.com, but also on ad-hoc networks where the connections between the nodes then are based on users connection to the ad-hoc network. In this sense the social network used by the described method can be comprised of users connected to a same ad-hoc network or another network. Hence, the method can be realized by implementing software instructions which when run in a social networking system or recommender system and/or on a number of computer clients perform the above described method of providing content.

Software instructions (modules or routines), i.e. a computer program code for carrying out methods performed in the previously discussed server and client may for development convenience be written in a high-level programming language such as Java, C, and/or C++ but also in other programming languages, such as, but not limited to, interpreted languages. Some modules or routines may be written in assembly language or even micro-code to enhance performance and/or memory usage. This includes e.g. the social network modules 505, 605 and the weight updating modules 507, 607 as well as any other software implementable functionality described herein.

Although various embodiments of the invention have been described and shown, the invention is not restricted thereto, but may also be embodied in other ways within the scope of the subject-matter defined by the above described method. In particular, the invention may be implemented by using other techniques for iteratively traversing computer clients associated via a social network.

The invention claimed is:

1. A method of providing content associated with an initial weight-value to a current computer associated with a current user that is represented by a first node in a social network, the method comprising:
    enabling the current computer to display the content for the current user in dependence of the initial weight-value;
    obtaining an input of the current user, wherein the input is associated with the content;
    calculating a new weight-value in dependence on the input of the current user, wherein the new weight-value is greater than the initial weight-value associated with the content;
    associating the new weight-value with the content;
    determining a receiving computer associated with a receiving user that is represented by a second node in the social network based on a connection in the social network between the first node and the second node; and
    providing the content to the receiving computer.

2. The method according to claim 1, further comprising allowing the current user to forward the content to the receiving computer.

3. The method according to claim 1, further comprising combining weight-values associated with similar contents enabled at the current user.

4. The method according to claim 1, wherein the calculating the new weight-value comprises: calculating a first value in dependence on the input of the current user; calculating a second value in dependence on a connection between the first node and the second node; and using the first value and the second value in calculating the new weight-value.

5. The method according to claim 1, wherein the calculating the new weight-value comprises: calculating a first value in dependence on the input of the current user; calculating a second value in dependence on the content; and using the first value and the second value in calculating the new weight-value.

6. The method according to claim 1, wherein the calculating the new weight-value comprises: calculating a first value in dependence on the input of the current user; calculating a second value in dependence on a variable selected by the current user; and using the first value and the second value in calculating the new weight-value.

7. The method according to claim 1, wherein the calculating the new weight-value comprises: calculating a first value in dependence on the input of the current user; calculating a second value in dependence on the amount of elapsed time between the causing the display of the content and the obtaining of the user input; and using the first value and the second value in calculating the new weight-value.

8. The method according to claim 1, wherein the content comprises a reference to information describing the content.

9. The method according to claim 1, wherein the content comprises an identifier of a user associated with a computer that first provided the content to any receiving computer.

10. The method according to claim 1, wherein the content comprises a reference to a number of users associated with a respective computer that previously provided the content to any receiving computer.

11. The method according to claim 1, wherein the content comprises time data set at the time of causing the display of the content.

12. The method according claim 1, wherein the method is performed in an executing computer, the executing computer is a computer server, and the current computer and the receiving computer are computer clients connected to the computer server.

13. The method according to claim 1, wherein the method is performed in an executing computer, the executing computer is the current computer, and the current computer and the receiving computer are computer nodes in a peer-to-peer network.

14. The method according to claim 1, further comprising transmitting the content associated with the new weight-value to a receiving computer.

15. The method according to claim 1, wherein the enabling the current computer to display the content for the current user in dependence on the initial weight-value comprises:
    determining whether the initial weight-value meets or exceeds a predetermined threshold value; and
    in response to determining that the initial weight-value meets or exceeds the predetermined threshold value, enabling the current computer to display the content.

16. The method according to claim 1, wherein the step of enabling the current computer to display the content for the current user in dependence on the weight value comprises transmitting the content together with the weight-value to the current computer.

17. A computer server for providing content associated with an initial weight-value to a current computer client associated with a current user that is represented by a first node in a social network, the computer server comprising:
    an enabling unit operable to enable the current computer client to display the content for the current user in dependence on the initial weight-value;
    an input unit operable to obtain an input of the current user, wherein the input is associated with the content;
    a calculating unit operable to calculate a new weight-value for the content, in dependence of the input of the current user, wherein the new weight-value is greater than the initial weight-value;
    an associating unit configured to associate the new weight-value with the content;
    a determining unit operable to determine a receiving computer client associated with a receiving user that is represented by a second node in the social network, based on a connection in the social network between the first node and the second node; and
    a providing unit operable to provide the content to the receiving computer.

18. A computer for providing content associated with an initial weight-value to a computer which is associated with a current user that is represented by a first node in a social network, the computer comprising:
    a display unit operable to enable the computer to display the content for the current user in dependence on the weight-value;
    an input unit operable to obtain an input of the current user, wherein the input is associated with the content;
    a calculating unit operable to calculate a new weight-value for the content in dependence of the input of the current user, wherein the new weight-value is greater than the initial weight-value;
    an associating unit configured to associate the new weight-value with the content;
    a determining unit operable to determine a receiving computer client associated with a receiving user that is represented by a second node in the social network, based on a connection in the social network between the first node and the second node; and
    a providing unit operable to provide the content to the receiving computer.

19. A computer program product comprising a non-transitory computer readable medium storing a computer program comprising processing instructions which when run on an executing computer causes the executing computer to perform the steps of:
    enabling a current computer to display content for a current user in dependence on an initial weight-value, wherein the current user is represented by a first node in a social network;
    obtaining an input of the current user, wherein the input is associated with the content;
    calculating a new weight-value for the content in dependence on the input of the current user, wherein the new weight-value is greater than the initial weight-value;
    associating the new weight-value with the content;
    determining a receiving computer associated with a receiving user that is represented by a second node in the social network, based on a connection in the social network between the first node and the second node; and
    providing the content to the receiving computer.

20. A content distribution method, comprising:
    receiving a content item;
    receiving a first weight-value associated with the content item;
    in response to receiving the content item, determining whether the content item should be displayed, wherein the determining comprises determining whether the first weight-value is not less than a threshold value;
    in response to determining that the content item should be displayed, displaying the content item;
    receiving from a first user an input related to the content item;
    based on the input, calculating a new weight-value and associating the new weight-value with the content;
    determining a second user connected to the first user in a social network;
    transmitting the content item and the new weight-value to the second user.

21. The method of claim 20, wherein
    the method further comprises receiving a second weight value associated with the content item, and
    the step of determining, based on the weight-value, whether the content item should be displayed, comprises combining the first weight-value and the second weight-value to produce a combined weight value and using the combined weight value to determine whether the content item should be displayed.

22. The method of claim 20, wherein the step of transmitting the content item to the second user comprises transmitting the content item to a computer used by the second user.

23. The method of claim 20, wherein the step of determining the second user comprises displaying a list of users so that the first user can select a user from the list and determining the selected user, wherein the selected user is the second user.

24. The method of claim 20, wherein the content items consists essentially of a hyperlink.

25. The method of claim 20, wherein the content items comprises content data.

* * * * *

UNITED STATES PATENT AND TRADEMARK OFFICE
CERTIFICATE OF CORRECTION

PATENT NO. : 8,843,463 B2  
APPLICATION NO. : 13/254675  
DATED : September 23, 2014  
INVENTOR(S) : Moritz et al.

Page 1 of 1

It is certified that error appears in the above-identified patent and that said Letters Patent is hereby corrected as shown below:

Title Page

Item (75), under "Inventors", in Column 1, Line 2, delete "Bjork," and insert -- Björk, --, therefor.

Item (75), under "Inventors", in Column 1, Line 3, delete "Lidstrom," and insert -- Lidström, --, therefor.

Item (75), under "Inventors", in Column 1, Line 4, delete "Soderberg," and insert -- Söderberg, --, therefor.

In the Specification

In Column 5, Line 62, delete "which" and insert -- which: --, therefor.

In Column 6, Line 45, delete "0.3 can represent an unknown person, 0.6" and insert -- 0,3 can represent an unknown person, 0,6 --, therefor.

In Column 8, Line 61, delete "bee" and insert -- be --, therefor.

In Column 9, Line 33, delete "form" and insert -- from --, therefor.

In the Claims

In Column 16, Line 46, in Claim 21, delete "wherein" and insert -- wherein: --, therefor.

Signed and Sealed this  
Fifth Day of July, 2016

Michelle K. Lee  
*Director of the United States Patent and Trademark Office*